(12) United States Patent  
Marin et al.

(10) Patent No.: US 6,925,387 B2  
(45) Date of Patent: Aug. 2, 2005

(54) METHOD AND APPARATUS FOR KINEMATICALLY LINKING MULTIPLE SEISMIC DOMAINS

(75) Inventors: Irina A. Marin, Horsham (GB); Thomas Gehrmann, Hundvaag (NO)

(73) Assignee: WesternGeco L.L.C., Houston, TX (US)

( * ) Notice: Subject to any disclaimer, the term of this patent is extended or adjusted under 35 U.S.C. 154(b) by 157 days.

(21) Appl. No.: 10/660,852

(22) Filed: Sep. 12, 2003

(65) Prior Publication Data

US 2005/0038604 A1 Feb. 17, 2005

Related U.S. Application Data

(60) Provisional application No. 60/495,054, filed on Aug. 14, 2003.

(51) Int. Cl.[7] .................................................. G01V 1/28
(52) U.S. Cl. ....................................................... 702/16
(58) Field of Search .............................. 702/14, 16, 17, 702/18, 13, 5; 367/73

(56) References Cited

U.S. PATENT DOCUMENTS

| | | | |
|---|---|---|---|
| 5,729,451 A | * | 3/1998 | Gibbs et al. .................... 702/12 |
| 5,808,964 A | * | 9/1998 | Lailly et al. .................... 367/73 |
| 6,028,819 A | | 2/2000 | Mullarkey et al. ............. 367/37 |
| 6,035,255 A | | 3/2000 | Murphy et al. ................ 702/11 |
| 6,044,328 A | | 3/2000 | Murphy et al. ................ 702/11 |
| 6,070,125 A | | 5/2000 | Murphy et al. ................ 702/11 |
| 6,826,483 B1 | * | 11/2004 | Anderson et al. .............. 702/13 |

OTHER PUBLICATIONS

"Society of Exploration Geophysicists Annual Conference and Exposition—Dallas 2003", *Technology Watch Report*, 2003 The Data Room, SEG Dallas 2003, pp. 1–3.
Landmark Press Release, *Landmark Releases ProMAGIC Server—Integration software connects ProMAX and GeoProbe for Rapid Prospect Generation*.. Retrieved Jun. 8, 2004, from http://www.lgc.com/news/pressreleases/20031027-landmark+releases+promagic.htm.
Landmark, *ProMAGIC Server integrates ProMAX® seismic processing with the 3–D visualization environment of GeoProbe® for rapid prospect generation*. Retrieved Jun. 8, 2004 from http://www.lgc.com/productsservices/geophysicaltechnologies/promagic/default.htm. (total of 8 pages).

* cited by examiner

*Primary Examiner*—Donald McElhey, Jr.
(74) *Attorney, Agent, or Firm*—WesternGeco, L.L.C.

(57) ABSTRACT

A method and apparatus for utilizing seismic data contemporaneously across multiple seismic domains is disclosed. The method comprises kinematically linking a first point in a set of seismic data having at least three-dimensions in a first seismic domain with a second point in the set of seismic data in a second seismic domain related to the first seismic domain by a velocity model in time or in depth. The apparatus includes, in various aspects, a program storage medium encoded with instructions that, when executed by a computer, perform such a method and a computer programmed to perform the method.

65 Claims, 6 Drawing Sheets

METHOD AND APPARATUS FOR KINEMATICALLY LINKING MULTIPLE SEISMIC DOMAINS

This application claims the earlier effective filing date of co-pending Provisional U.S. Patent Application, Ser. No. 60/495,054, entitled METHOD AND APPARATUS FOR KINEMATICALLY LINKING MULTIPLE SEISMIC DOMAINS, filed Aug. 14, 2003, in the name of Irina Apostoiu Marin et al.

BACKGROUND OF THE INVENTION

1. Field of the Invention

The present invention pertains to seismic data processing, and, more particularly, to a method and apparatus for using a set of seismic data contemporaneously across multiple seismic domains.

2. Description of the Related Art

Seismic prospecting generally involves generating one or more sets of seismic data regarding a subterranean geological formation. A variety of techniques analyze seismic data with the goal of identifying characteristics of the geological formation that may indicate the presence of hydrocarbon deposits. Some techniques are directed to improving the quality of the seismic data. "Stacking," for instance, is a process in which traces (i.e., seismic data recorded from a single channel of a seismic survey) are added together from different records to reduce noise and improve overall data quality. Characteristics of seismic data (e.g., time, frequency, depth) derived from stacked data are referred to as "post-stack" but are referred to as "pre-stack" if derived from unstacked data. Other techniques, however, pertain more directly to the substantive analysis of the seismic data.

Such techniques commonly apply a velocity model to the seismic data. The velocity model is used by dynamic conversion mechanisms that converts the seismic data from one seismic domain into other seismic data in another seismic domain. (e.g., stacking, pre or post-stack, time or depth migration). For instance, the seismic data may be presented in a time, or a depth domain, a pre or post stack domain, a migrated or un-migrated domain, an acoustic or elastic domain, a specific historic time domain (for 4D data) etc. Some commonly used seismic domains include:

- pre-stack time (raw or migrated);
- pre-stack time (acoustic or elastic, including converted);
- post-stack time (migrated or un-migrated);
- post-stack depth (migrated pre or post-stack, re-migrated);
- pre-stack depth;
- depth;
- pre-stack acoustic ("PP");
- pre-stack converted ("PS"); and
- four-dimensional ("4D") seismic data from different vintages;

This list is not exhaustive, however, as the art employs still other seismic domains.

It is well known that each seismic domain is limited in its capabilities to completely image the subsurface. For instance, in the unmigrated seismic domain, events are distorted and interfere with each other, while in the migrated domain, events have a much more geological aspect, but there are migration artifacts. In the time domain, events are mispositioned laterally, while in the depth domain, they should be closer to true geological position, depending on the Earth velocity model correctness. However some migration algorithms lose information recorded in the time domain (e.g., steep flanks, multiple arrivals, etc). PP data cannot image through gas clouds while converted PS data can, etc.

However, different seismic domains can carry complementary information, and therefore should be considered in concert. Those in the art commonly consider the seismic data in one or more domains through concurrent (i.e., roughly at the same time) visualizations of the data in multiple seismic domains. Typically, such a visualization is a graphical display, and each display may be referred to as a "visualization canvas."

Analysts find it useful to link visualizations of different seismic domains so that a data point under consideration in one seismic domain is graphically indicated in a second seismic domain. Well known methods exist which attempt to link different seismic domains in a graphic environment. Exemplary conventional methods include:

- on-the-fly time-to-depth or depth-to-time conversion of the seismic display (e.g., for seismic synthetic generation based on well logs), time-to-depth conversion of the seismic interpretation (sometimes called "map migration"), etc.;
- superposition of the interpretation coming from different seismic domains on the same seismic domain display (e.g., PS depth interpretation in the PP depth seismic domain display or vice versa; representing several vintages of 4D seismic interpretation on the same seismic vintage display);
- cursor tracking between two or several two-dimensional ("2D") frames of similar seismic domains (e.g., either all in time or all in depth) based on their geographical location (e.g., cursor tracking between a PP time seismic version and a PS time seismic version); and
- ray path display to link the geographical location of the source, receiver, and reflection point, but not the travel time and the reflection point.

However, these methods have some problems.

Although very useful to get a rough insight of the link between different seismic domains, these methods are sometimes based on simplistic assumptions regarding the conversion between the domains (e.g., vertical stretch and vertical assumptions for velocity extraction) and, moreover, are not consistent with the dynamic conversion applied to the seismic data (e.g., vertical stretch is used between post-stack time migrated domain and post-stack depth migrated domain). Therefore, they are erroneous and can be misleading as soon as the simplistic assumptions are not fulfilled (e.g., dipping structures, faults, lateral velocity variations, anisotropy, etc.).

The present invention is directed to resolving, or at least reducing, one or all of the problems mentioned above.

SUMMARY OF THE INVENTION

A method and apparatus for utilizing seismic data contemporaneously across multiple seismic domains is disclosed. The method comprises kinematically linking a first point in a set of seismic data having at least three-dimensions in a first seismic domain with a second point in the set of seismic data in a second seismic domain related to the first seismic domain by a velocity model in time or in depth. The apparatus includes, in various aspects, a program storage medium encoded with instructions that, when executed by a computer, perform such a method and a computer programmed to perform the method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
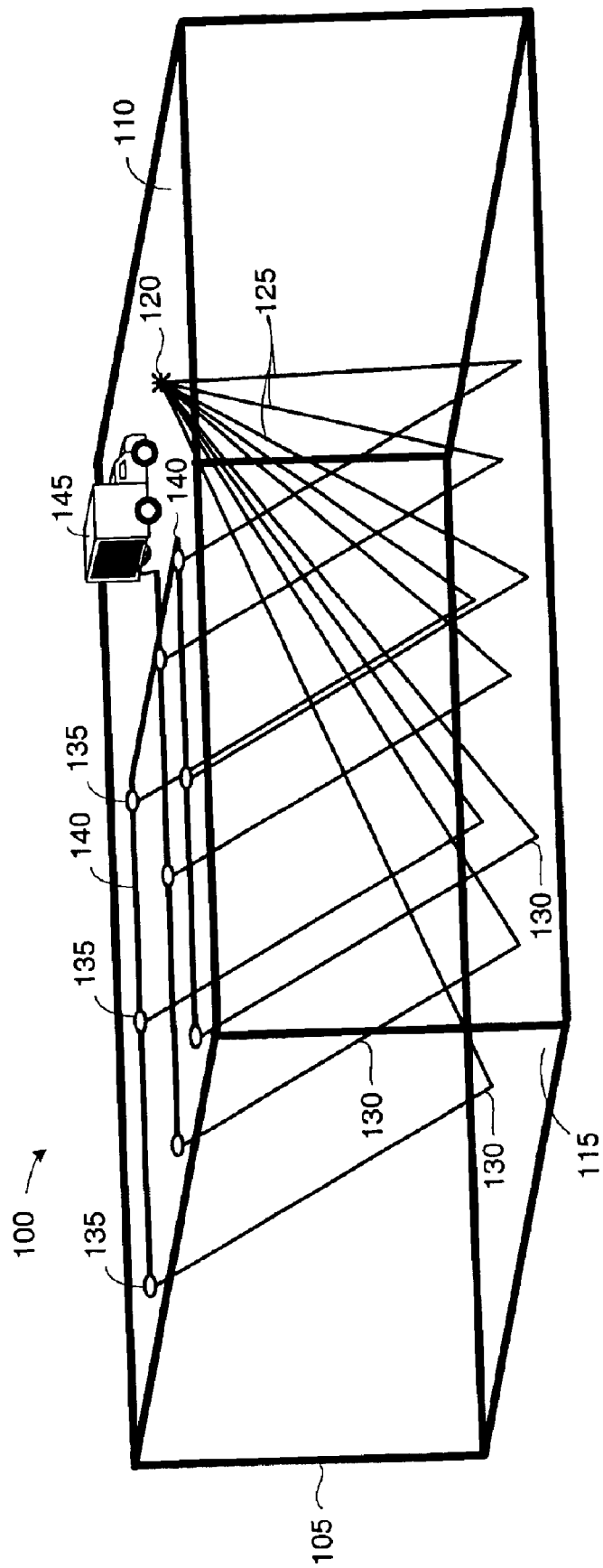
FIG. 1 depicts, in a conceptualized fashion, a land-based survey of a subterranean geological formation generating seismic data such as that which the present invention may be practiced.

FIG. 1 depicts, in a conceptualized fashion, a land-based survey 100 of a subterranean geological formation 105 generating a set of seismic data such as that which the present invention may be practiced. The geological formation 105 includes, in the illustrated embodiment, the surface 110 and a reflector 115. The geological survey 100 includes an elastic source 120 that imparts elastic waves 125 (only three indicated) into the geological formation 105. The elastic waves 125 will comprise a compressional wave ("P-wave") and, sometimes, a shear wave ("S-wave"), neither of which are shown. The component(s) of the elastic wave 125 are reflected, and may be converted, by the reflector 115, and the reflections 130 (only three indicated) are received by a plurality of seismic sensors 135 (only three indicated). The seismic sensors 135 generate electrical signals (not shown) representative of the received reflections 130. The electrical signals are embedded with information regarding the geological formation 105. The electrical signals are transmitted over the lines 140 (not all indicated) to a recording truck 145, where they are captured as seismic data.

Those skilled in the art having the benefit of this disclosure will appreciate that this illustration is highly idealized. For instance, most surveys will be of formations deep beneath the surface. The formations will typically include multiple reflectors, some of which will include dipping events, and will generate multiple reflections (including wave conversion) for receipt by each of the seismic sensors. Furthermore, the present invention may be performed on virtually any seismic data, regardless of how acquired. The seismic survey 100 may therefore, in alternative embodiments, be a subsea survey or conducted in transitional zones between land and water. The information embedded in the electrical signals generated by the seismic sensors may also, in some embodiments, be transmitted wirelessly.

Figure 2:
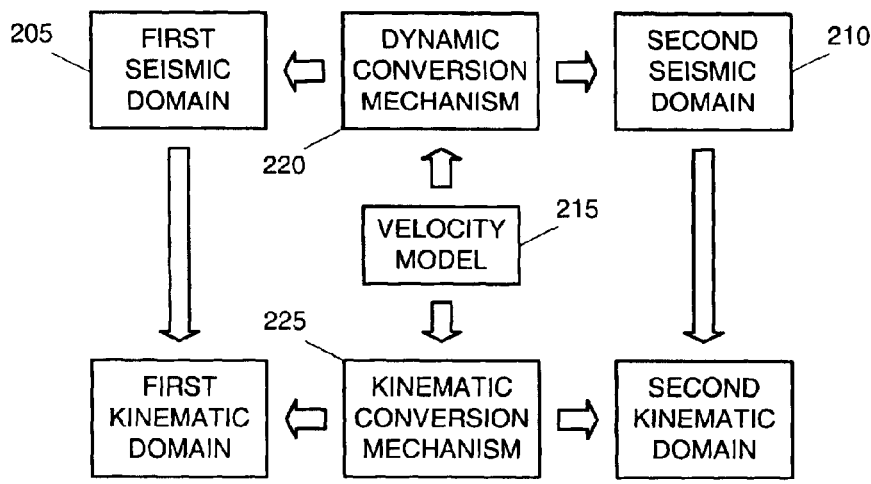
FIG. 2 conceptually illustrates the present invention in one particular embodiment.

The invention includes a method for utilizing seismic data contemporaneously across multiple seismic domains. The method comprises kinematically linking a first point in a set of multi-dimensional (3D and higher dimension) seismic data in a first seismic domain with a second point in the set of multi-dimensional seismic data in a second seismic domain related to the first seismic domain by a velocity model in time or in depth, using one or two 3D visualization canvases. Referring now to FIG. 2, the seismic data is then processed in accordance with conventional practice into multiple seismic domains (e.g., stacking, migration). In theory, the invention may be applied across as many seismic domains as one desires so long as there is sufficient data and the domains are related by one or more velocity model(s) in time or in depth. Those in the art having the benefit of this disclosure will appreciate that the available computational power and the available data will limit the number and types of domains as a practical matter. The illustrated embodiment is employed across only two seismic domains that are related by a known velocity model in either time or depth, i.e., the first seismic domain 205 and the second seismic domain 210.

Exemplary seismic domains across which the illustrated invention may be employed include:
  post-stack time (migrated or un-migrated) and post-stack depth;
  pre-stack (raw or migrated) time and depth;
  post-stack depth and depth;
  post-stack depth and post-stack depth re-migrated;
  pre-stack time and pre-stack depth (including zero offset);
  pre-stack (raw) time and pre-stack migrated time;
  pre-stack acoustic ("PP") and pre-stack converted ("PS"); and
  four-dimensional ("4D") seismic data from different vintages.

However, the list is exemplary only, and is not exhaustive. Those in the art having the benefit of this disclosure may appreciate other combinations of seismic domains across which the present invention may be employed.

The multiple seismic domains are generated by applying one or more three-dimensional ("3D") velocity models to the seismic data. In the illustrated embodiment, the second seismic domain 210 is generated by applying the velocity model 215 to the seismic data in the first seismic domain 205. Note, however, that the first seismic domain 205 may be generated from the second seismic domain 210 in alternative embodiments. The velocity model 215 may be, for example, an acoustic or elastic, isotropic or anisotropic velocity model. The velocity model 215 is employed by some dynamic conversion mechanism 220 to generate one seismic domain from the other. The dynamic conversion mechanism 220 may be, e.g., a post-stack migration or a pre-stack migration in time or in depth, either acoustic or elastic which correspond to a vertical stretch, a zero-offset conversion, an image ray conversion, multi-offset conversion, elastic conversion, 4D conversion, etc., type of kinematic mechanism. The velocity model 215 may be implemented with any suitable 3D velocity model known to the art, so long as it relates the first and second seismic domains 205, 210 in time or in depth. Those in the art having the benefit of this disclosure will appreciate that 3D velocity models may also be applied to one-dimensional and two-dimensional seismic data.

Figure 3:
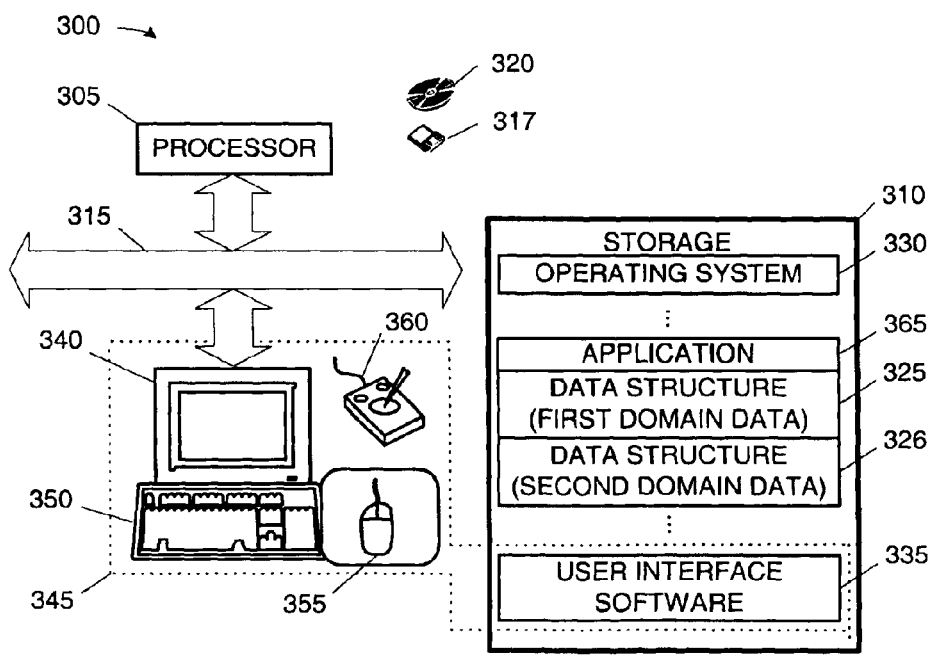
FIG. 3 conceptually illustrates a computing apparatus with which the present invention may be practiced.

FIG. 3 illustrates an exemplary computing apparatus on which the processing may be performed. The computing apparatus 300 includes one or more processors 305 communicating with storage 310 over a bus system 315. The storage 310 may include a hard disk and/or random access memory ("RAM") and/or removable storage such as a zip magnetic disk 317, removable hard drive (not shown), or an optical disk 320. The storage 310 is encoded with one or more data structures 325, 326 storing the seismic data set acquired as discussed above, an operating system 330, user interface software 335, and an application 365. Note that the seismic data is stored in both the first and second seismic domains 205, 210 in the data structures 325, 326 in the storage 310. The application 365, when invoked, implements the method of the invention.

The present invention employs, in some embodiments, visualizations of the seismic data, as will be discussed further below. In some of these embodiments, a user may interact with the visualizations. The user interface software 335, in conjunction with a display 340, implements a user interface 345. The user interface 345 may include peripheral I/O devices such as a keypad or keyboard 350, a mouse 355, or a joystick 360. In the illustrated embodiment, the user interface 345 is a graphical user interface ("GUI"), but any suitable interface known to the art may be employed. Alternative embodiments, not illustrated, may employ "virtual reality" interaction—type interfaces, including peripherals such as acoustic or magnetic motion tracking system made of a wand and a head sensor, in addition to, or in lieu of, a GUI.

The processor 305 runs under the control of the operating system 330, which may be practically any operating system known to the art. The application 365 is invoked by the operating system 330 upon power up, reset, or both, depending on the implementation of the operating system 330. In the illustrated embodiment, the application 365 processes relatively large volumes of the seismic data for graphical display, and so is relatively computationally intensive. Thus, the processor 305 should be relatively powerful, and may be implemented as a processor set including a general purpose microprocessor with a graphics co-processor. Similarly, the computing apparatus 300 may be implemented as a workstation. However, this is not necessary to the practice of the invention, and any suitable computing apparatus may be employed.

Note that the physical location at which the processing occurs is not material to the practice of the invention. The seismic data may be processed at the point of collection, e.g., aboard the recording truck 145 in FIG. 1, but this is unlikely. The seismic data will typically be processed at some processing facility remote from where it is collected. The seismic data may be delivered to the point of processing in any convenient manner. For instance, the seismic data can be wirelessly transmitted to the processing facility, or transmitted over a network (e.g., a wide area network ("WAN") or the Internet), or may be encoded on a storage medium that is then physically transported to the processing facility.

Furthermore, the multiple seismic domains do not need to be generated on the same machine, in the same location, or at the same time. Thus, the multiple seismic domains may be generated by a single user on a single machine, multiple users on multiple machines (regardless of whether the machines are networked), or a single user on multiple machines. Where they are developed on multiple machines, the machines may located in the same room or across the globe. Similarly, they may be generated in a single computing session or years apart. However, the invention assumes some knowledge of the processing, as described below, which will be facilitated by proximity in time and location.

Figure 4:
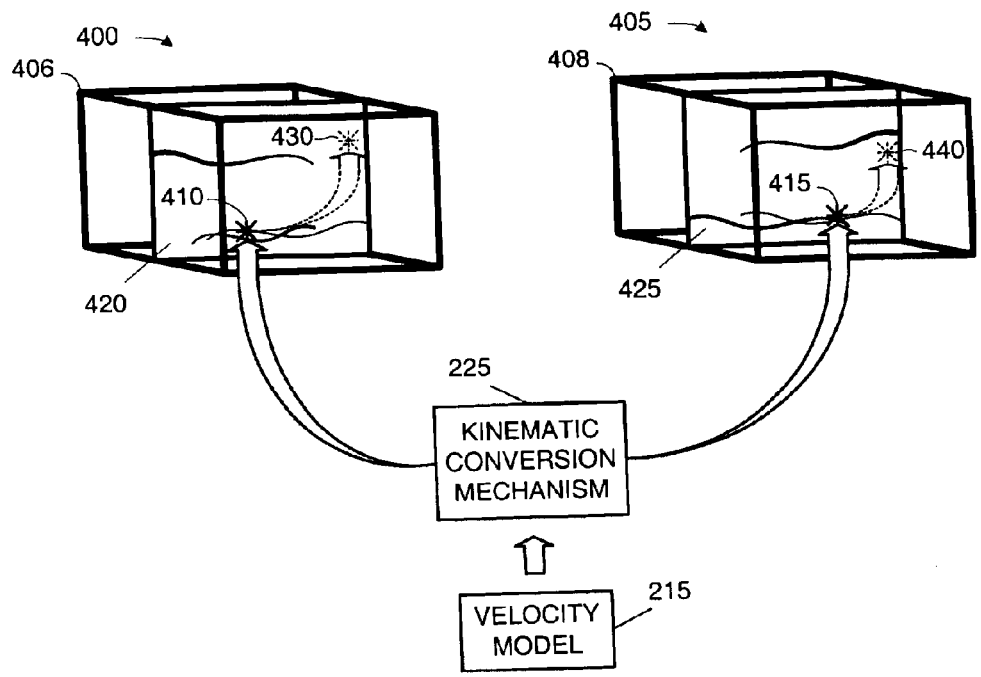
FIG. 4 depicts two visualizations of the first and second seismic domains of FIG. 2 with kinematically linked cursors in accordance with the present invention.

In the illustrated embodiment, the 3D seismic data, once processed into the first and second seismic domains 205, 210, is then generated into visualization canvases that are displayed to a user. Techniques for producing such visualizations are well known to the art. FIG. 4 depicts two visualizations 400, 405 of the first and second seismic domains 205, 210, respectively, of FIG. 2. In the illustrated embodiment, the first seismic domain 205 in the visualization 400 is a post stack time domain and the second seismic domain 210 in the visualization 405 is a post-stack depth domain.

The visualizations 400, 405 comprise three-dimensional volumes 406, 408, respectively, populated with the seismic data of the first and second seismic domains 205, 210, respectively. The visualizations 400, 405 also include cursors 410, 415 that are kinematically linked in accordance with the present invention. The cursors 410, 415 identify correlated data points (not otherwise shown) in the first and second seismic domains 205, 210, respectively. The data points are visualized in slices 420, 425 of the volumes 406, 408, respectively, although this is not necessary to the practice of the invention. In the illustrated embodiment, the visualizations 400, 405 are communicated in a graphical display on the monitor 340 through the user interface 345. However, the invention is not so limited. For instance, the visualization may be projected. The manner in which the visualization is communicated to the user is not material to the practice of the invention.

Still referring to FIG. 4, as previously mentioned, each of the kinematically linked cursors 410, 415 identifies a common, correlated data point (not otherwise shown) in the first and second seismic domains 205, 210. Note that the correlation is not linear, i.e., the data points are visualized at different coordinates of the respective volumes 406, 408. This non-linearity can make it difficult for a user to move between the displayed visualizations 400, 405 in conventional techniques. Thus, the cursors 410, 415 are kinematically linked in accordance with the present invention so that as one of the cursors 410, 415 is translated in its respective seismic domain, the other is moved in its respective domain to the correlated data point. The translations are indicated in FIG. 4 by the ghosted lines 435, 445.

Referring now to both FIG. 2 and FIG. 4, the cursors 410, 415 are kinematically linked through a kinematic conversion mechanism 225. The kinematic conversion mechanism 225 is the same type of mechanism as the dynamic conversion mechanism 220, e.g., vertical stretch, ray tracing, or Eikonal wave front reconstruction. For instance, if the dynamic conversion mechanism type 220 is a vertical stretch, then the kinematic conversion mechanism type 225 should also be a vertical stretch. Note that the dynamic conversion mechanism 220 and the kinematic conversion mechanism 225 are of the same type, the dynamic mechanism involves the amplitude and frequency of the signal, whereas the kinematic one is a high frequency approximation of the dynamic one and does not involve amplitudes. The conversion type is given by the 3D path along which the conversion is implemented: vertical or along specific ray paths. Thus, the invention assumes some knowledge of the type of the dynamic conversion mechanism 220 by which the first and second seismic domains 205, 210 are generated. This implies some knowledge of the velocity model 215 by which the seismic domains 205, 210 are related. Furthermore, the invention assumes that the type of the dynamic conversion mechanism 220 can be applied kinematically. In the illustrated embodiment, the kinematic conversion mechanism 225 is a zero-offset ray trace. In other words, the cursor link uses zero-offset ray tracing (or eventually an image ray if the post-stack time domain has been migrated) based on the same velocity model 215 as the one used for the post-stack depth migration.

Note that, although not shown, the invention is not limited to one-to-one correspondence of data points in the first and second seismic domains 205, 210. One data point in one domain may be linked to several points in the other domain. For example, the interference point between two reflections in pre-stack raw time domain or the crossing point of a triplication in the time stack domain come from two different reflectors or from three different reflection points of the same reflector. The ambiguity can be resolved by navigating along the neighboring points of the same event. The present invention can also be extrapolated to this eventuality. Using the example presented above, the kinematic conversion mechanism 225 can be applied to the interference point or the crossing point to track the cursors 410, 405 in the other domain to find the two points. The invention can also be applied to collections of points in one domain linked to collections of points in another. Thus, the linking can be performed either point-by-point (i.e., cursor tracking) or surface (horizons or faults) patch by surface patch.

FIG. 4 illustrates an embodiment in which the first and second seismic domains 205, 210 are separately visualized, but not all embodiments are so limited. Alternative embodiments may visualize the first and second seismic domains 205, 210 on a single visualization canvas. The invention is not limited by the manner in which the visualizations are implemented or communicated. In one or several 3D visualization canvases, the different seismic domains will typi-

TABLE 2

Exemplary Seismic Domains, Velocity Models, and Conversion Mechanisms

| First Seismic Domain | Velocity model | Conversion Mechanism | Second Seismic Domain |
|---|---|---|---|
| Post-stack time | An Earth Velocity model ("Migration velocities in depth") | Normal (zero-offset) ray (abusively replaced by vertical stretch) | Post-stack depth or depth |
| Post-stack migrated time | Migration velocities in depth | Image ray (abusively replaced by vertical stretch) | Post-stack depth or depth |
| Pre-stack time | Migration velocities in depth | Multi-offset rays | Pre-stack depth |
| Pre-stack time | Migration velocities in depth | Normal (zero-offset) ray | Post-stack depth or depth |
| Post-stack depth | Correct Earth velocity | Re-conversion along zero or multi-offset rays | Depth |
| PP pre-stack time | Vp/Vs | Multi-offset conversion | PS pre-stack time |
| Post-stack time (vintage historic time 1) | V = function (historic time or fluid pressure) | Image ray (abusively replaced by vertical stretch) | Post-stack time (vintage historic time 2) |

Returning to FIG. 4, assume a scenario in which the cursor 410 is translated to a new position 430 in the first volume 406, as indicated by the ghosted lines 435. The application 365 applies the kinematic conversion mechanism 225 to the cursor 415 to translate the cursor 415 to the corresponding new position 440 in the second volume 408, as indicated by the ghosted lines 445. In the illustrated embodiment, this occurs interactively responsive to the translation input by, typically, a user. Those in the art having the benefit of this disclosure will appreciate, the amount of interactivity will depend on the amount of data to be linked and the amount of computation required for the link. For example, if kinematic data has already been extracted in one domain (e.g., horizons in time=post-stack time migrated interpretation) and kinematically converted into the other domain (e.g., horizons in depth obtained by map migration or vertical stretch), the cursors 410, 415 may interactively link the two seismic domains 205, 210 in real-time, or near real-time.

cally be displayed individually and only the kinematic data associated with the subject data points will be visually superposed for use in interpretation. However, in some embodiments, the user may expressly request kinematic data from the second seismic domain 210 be superposed on dynamic data from the first seismic domain 205, or vice-versa. Note that this visualization of the kinematic and dynamic data for interpretation purposes is merely a matter of visualization and is distinct from kinematically linking multiple seismic domains in accordance with the invention.

The illustrated embodiment does not retain full waveform simulation or inversion algorithms with noise. Consequently, the dynamic conversion mechanism 220 may not be symmetric. Moving from the first seismic domain 205 to the second seismic domain 210 through dynamic conversion mechanism 220 and back again may not return the user to the original wavefield from which he started. However, the kinematic conversion mechanism 225 should be symmetric.

Besides velocity model-based common navigation and interpretation between seismic domains, the present invention can be employed in other applications, such as:

- kinematically linking between more than two seismic domains to detect geophysical discrepancies between the linked seismic domains to, for instance, apply quality control to velocity models and/or test the adequacy of conversion mechanisms;
- kinematically linking between several seismic domains with the cursor in the interpretation "mode" to speed up the iterative process of "seeding"-"hunting"-"persisting" of kinematic information useful in, for example, migration velocity update methods;
- velocity model based gathering of seismic traces; and
- 3D graphic (not only "geographic") common navigation between two or more seismic domains for centering the views, common/similar zooming, slicing through the volume, common "flying" ala "well eye", etc.

These particular embodiments will be discussed in turn below.

Figure 5:
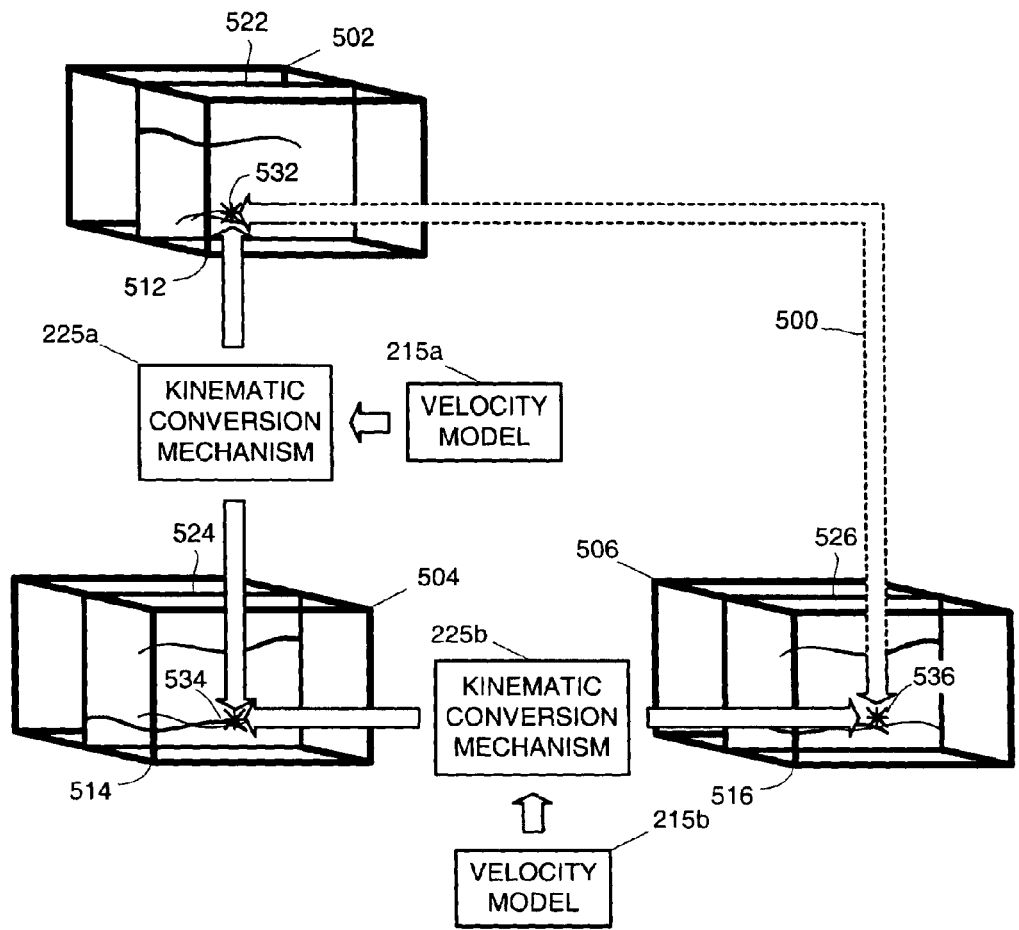

FIG. 5 and FIG. 6A–FIG. 6C illustrate how the present invention can be applied to kinematically link across more than two seismic domains to detect geophysical discrepancies, conceptually illustrated by the ghosted lines 500, in a second particular embodiment. FIG. 5 illustrates three seismic visualizations 502, 504, 506 of three seismic domains. The three seismic domains 502, 504, 506 are visualized in three volumes 512, 514, 516, each having a slice 522, 524, 526, respectively, visualized in three volumes 512, 514, 516, respectively, each having a slice 522, 524, 526, respectively, on which a cursor 532, 534, 536, respectively, are located. Note that not all embodiments will slice the volumes 512, 514, 516, so some embodiments might omit the slices 522, 524, 526 from the volumes 512, 514, 516. The second seismic domain 504 has been derived from the first seismic domain 502 by the application of the first velocity model 215a. The third seismic domain 506 has been derived from the second seismic domain 504 by application of the second velocity model 225b.

The first seismic domain 502 is kinematically linked to the second seismic domain 504 through a first kinematic conversion mechanism 225a, associated with the velocity model 215a, as described above. The second seismic domain 504 is kinematically linked to the third seismic domain 506 through a second kinematic conversion mechanism 225b, associated with the velocity model 215b, also as described above. Note that the first and second velocity models 215a, 215b may be different and that the kinematic conversion mechanisms 225a, 225b are not necessarily of the same type. For example, the illustrated embodiment includes a PP pre-stack depth migration (i.e., with the associated kinematic conversion being multi-offset conversion based on PP velocity model) and a PS pre-stack depth migration (i.e., with the associated kinematic conversion being multi-offset conversion based on PS velocity model). A cursor tracking/interpretation between the two unrelated seismic domains 502, 506 can either provide the velocity model for the kinematic conversion mechanism that relates 502 to 506 or, it can highlight areas of discrepancy for further consistency improvements. The selected information includes the three seismic domains 502, 504, 506, the two velocity models 215a, 215b, and the associated kinematic conversion mechanisms 225a, 225b.

The second seismic domain 504 will be consistent with the first seismic domain 502 through application of the velocity model 215a. The second seismic domain 503 will also be consistent with the third seismic domain 504 through application of the velocity model 215b. All three seismic domains—502, 504, 506 are kinematically linked through the kinematic conversion mechanisms 225a, 225b. A user can then compare the first and third seismic domains 502, 506 through the kinematic link to search for discrepancies between the two domains 502, 506. Such discrepancies can then be traced back into the velocity models 215a, 215b, which can then be analyzed and improved for further application.

Figure 6A:
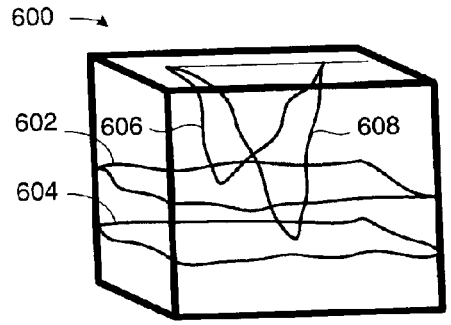
FIG. 5 and FIG. 6A–FIG. 6C illustrate how the present invention can be applied to kinematically link across more than two seismic domains to detect geophysical discrepancies between seismic domains in a second particular embodiment.
Figure 6B:
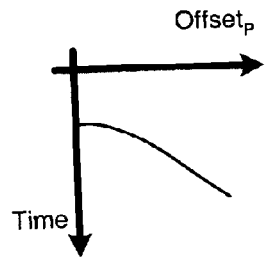
Figure 6C:
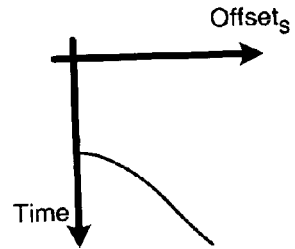

Consider the volume 600, which comprises a portion of a geologic formation, conceptually illustrated in FIG. 6A. The volume 600 includes a reflector that has been kinematically imaged with PP data in position 602 and with PS data in position 604, and two rays 606, 608 indicating the propagation of the associated reflection 606 and conversion 608 ("PS-wave") on that same reflector. FIG. 6B and FIG. 6C illustrate the kinematic pre-stack PP data 606, and kinematic pre-stack PS data 608 for the above reflector. In the illustrated embodiment, the three seismic domains 502 504, 506 in FIG. 5 generated for the seismic data representative of volume 600 are: a PP pre-stack time domain; a PS pre-stack time domain; and a depth domain, considered here as the equivalent of the elastic post-stack depth migrated domain with the correct elastic velocity model; respectively. In this particular embodiment, given the initial P-wave velocity Vp and the S-wave velocity Vs, for the rays 602, 604, the kinematic conversion mechanisms 215a, 215b can be used to tie PP and PS events 604, 602, respectively, in depth and therefore extract new, updated Vp and Vs models from solving the discrepancy of the PP and PS events 604, 602 in depth.

Figure 7:
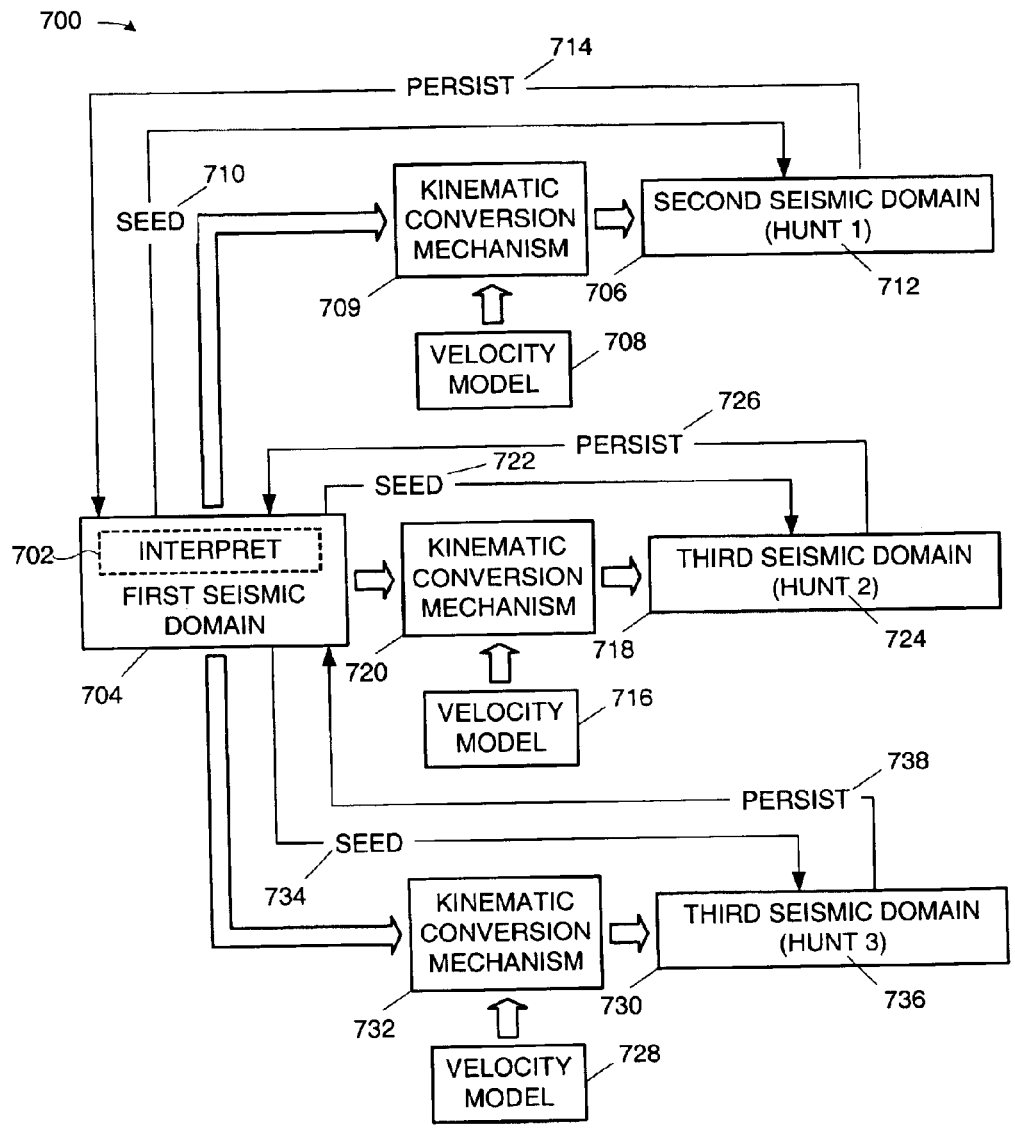
FIG. 7 illustrates application of kinematic links in accordance with the present invention to build a repository of complementary information extracted from the data based on the usage of several velocity models in a third particular embodiment.

FIG. 7 illustrates an application 700 of kinematic links in accordance with the present invention to build a repository of complementary information extracted from the data based on the usage of several velocity models in a third particular embodiment. The seismic domain that does not change with the velocity data (e.g., the pre-stack raw time domain) is used to deposit the information. The application 700 then iterates a seed-hunt-persist process, applying a new kinematic link in each iteration and an updated velocity model.

More particularly, the application 700 starts with an initial interpretation 702 in a first seismic domain 704. A second seismic domain 706 is generated from the first seismic domain 704 by application of the velocity model 708 and kinematically linked by the kinematic conversion mechanism 709, as discussed above. The initial interpretation 702 is then used as a seed (at 710) in the second seismic domain 712 over the kinematic link to anchor a hunt (at 712) in the second seismic domain 706. The hunt (at 712) is directed to locating information in the second seismic domain 706 regarding a dynamically linked point or region of interest that is unavailable in the first seismic domain 704. Such information is then back converted with the same velocity model 708 and persisted (at 714) to the first seismic domain 704, where it is stored.

The application 700 then updates or generates a new interpretation 702 of the first seismic domain 704 reflecting the original information and the persisted information resulting from the first hunt (at 712). The persisted information is also used to update or generate a new velocity model 716. The new velocity model 716 should be more accurate, or "truer", than the velocity model 708 because its formulation is predicated not only on the information originally available from the first seismic domain 704, but also the information persisted from the second seismic domain 706. A third seismic domain 718 is then generated from the first seismic domain 704 by application of the velocity model 716 and kinematically linked as described above through the kinematic conversion mechanism 720 associated with the velocity model 716. The third seismic domain 718 is then seeded (at 722) over the kinematic link for a hunt (at 724) for information over and above that in the first seismic domain 704. Note that the information in the first seismic domain 704 at this point includes not only the information originally found there, but also the information persisted there (at 714) from the second seismic domain 712. The information produced by the hunt (at 724) in the third seismic domain 718 is then back converted with velocity 716 and persisted (at 726) to the first seismic domain 704.

The interpretation 702 is updated and the truer velocity model 728 is developed from the first seismic domain, including the information persisted (at 714, 726) from the second and third seismic domains 706, 718. A fourth seismic domain 730 is generated from the first seismic domain 704 by application of the velocity model 728, kinematically linked to the first seismic domain 704 by the kinematic conversion mechanism 732, and seeded (at 734) with the updated interpretation 702. A hunt is performed (at 736) for additional information that is then persisted (at 738) back to the first seismic domain 704.

This seed-hunt-persist process can in theory be iterated as many times as the data in the first seismic domain 704 permits. Those in the art having the benefit of this disclosure will realize that practical consideration, such as cost, will frequently constrain the number of iterations for any given implementation. The application 700 iterates the seed-hunt-persist process a total of three times. However, this aspect of the invention is not limited by the number of iterations, and more or fewer iterations may be employed in alternative embodiments.

Figure 8:
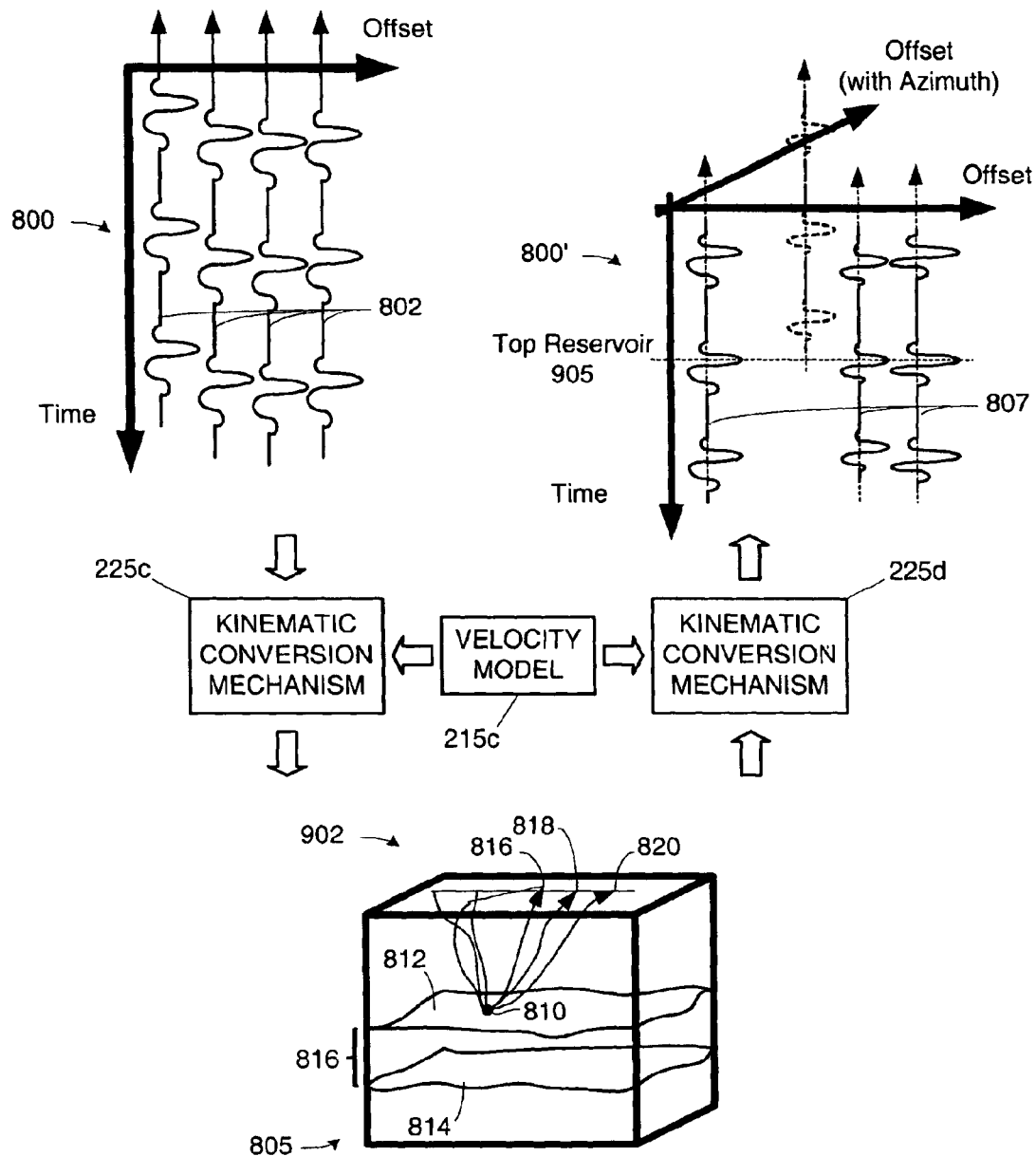
FIG. 8 illustrate an example of an application of kinematic links in accordance with the present invention to improve information exploitation by rearranging seismic traces in the multi-fold seismic domain, after a detour through an equivalent one fold domain, based on kinematic links, in a fourth particular embodiment.

FIG. 8 illustrates an example of an application of kinematic links in accordance with the present invention may be employed to improve information exploitation by rearranging seismic traces in the multi-fold seismic domain (e.g, pre-stack multi-azimuthal domain), after a detour through an equivalent one-fold domain. FIG. 8 depicts a multi-fold seismic domain 800 comprised of a plurality of traces 802 in a CMP gather—in the pre-stack time domain. The multi-fold seismic domain 800 is kinematically linked to the single fold seismic domain 805, e.g., the post stack depth domain. Cursor tracking as discussed relative to FIG. 4 above between the one fold seismic domain 805 and the multi-fold seismic domain 800 can be used to rearrange, or re-gather in a multi-fold domain 800', seismic traces. Such re-gathering, or rearranging, can help the logical exploitation of the seismic information, for example in CIP gathers made of the traces containing the reflection point where the cursor is positioned. Note that domain 800' also contains the azimuth information (fifth dimension) which was not shown in 800 for sake of clarity.

The multi-fold seismic domain 800 and the single-fold seismic domain 805 are related through the application of the velocity model 215c and are kinematically linked by the kinematic conversion mechanisms 225c. The multi-fold seismic domain 800' and the seismic domain 805 are related through the application of the same velocity model 215c and the same kinematic conversion mechanism 225c, but comprises new traces 807 in a rearrangement. FIG. 8 depict common reflection point 810 re-gathering of pre-stack traces in time for AVO/AVA or azimuthal processing. More particularly, FIG. 8 depicts a portion 902 of a geological formation, not otherwise shown, including two reflectors 812, 814. In the illustrated embodiment, the reflectors 812, 814 are the top and the base of a reservoir 816. A survey generates a plurality of rays 816, 818, 820 sharing the common reflection point 810. The seismic data obtained from the rays that share the same sources and receiver position as rays 816, 818, 820 but have different reflection points, is originally sorted into CMP gathers to populate the multi-fold domain 800, shown in FIG. 8, in accordance with conventional practice. Based on the reflection point selected by the cursor location in the post-stack domain 805, the pre-stack traces from the data storage 310 are reselected using rays 816, 818, 820 and displayed in a new arrangement as CIP gathers in 800'

Note that the present invention will typically be implemented on an appropriately programmed computing device, e.g., the computing apparatus 300 in FIG. 3. The instructions may be encoded on, for example, the storage 310, the zip disk 317, and/or the optical disk 320 as the application program 365. Thus, in one aspect, the present invention includes a computing apparatus programmed to perform the method of the invention. In another aspect, the invention includes a program storage device encoded with instructions that, when executed by a computing apparatus, perform the method of the invention.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a zip disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for utilizing seismic data contemporaneously across multiple seismic domains, the method comprising kinematically linking a first point in a set of seismic data having at least three-dimensions in a first seismic domain with a second point in the set of seismic data in a second seismic domain related to the first seismic domain by a velocity model in time or in depth.

2. The method of claim 1, further comprising visualizing the first and second seismic domains.

3. The method of claim 2, wherein kinematically linking the first point with the second point includes linking a cursor in the first seismic domain to a cursor in the second seismic domain.

4. The method of claim 1, further comprising commonly navigating between the first and second seismic domains over the kinematic link.

5. The method of claim 1, further comprising interpreting the seismic data.

6. The method of claim 1, wherein:
one of the first and second seismic domains comprises un-migrated post-stack time and the other one of the first and second seismic domains comprises post-stack depth;
one of the first and second seismic domains comprises migrated post-stack time and the other one of the first and second seismic domains comprises post-stack depth;
one of the first and second seismic domains comprises pre-stack time and the other one of the first and second seismic domains comprises depth;
one of the first and second seismic domains comprises post-stack depth and the second seismic domain comprises depth;
one of the first and second seismic domains comprises post-stack depth and the other one of the first and second seismic domains comprises re-migrated post-stack depth;
one of the first and second seismic domains comprises pre-stack time and the other one of the first and second seismic domains comprises pre-stack depth;
one of the first and second seismic domains comprises raw pre-stack time and the other one of the first and second seismic domains comprises migrated pre-stack time;
one of the first and second seismic domains comprises pre-stack acoustic and the other one of the first and second seismic domains comprises pre-stack converted; or
one of the first and second seismic domains comprises a set of four-dimensional seismic data from a first vintage and the other one of the first and second seismic domains comprises a set of four-dimensional seismic data from a second vintage.

7. The method of claim 1, wherein the velocity model comprises an acoustic velocity model, an elastic velocity model, being they isotropic or an anisotropic velocity model.

8. The method of claim 1, wherein the dynamic conversion mechanism comprises a vertical stretch, zero-offset conversion, image ray conversion, multi-offset conversion, elastic conversion, or four-dimensional conversion type of mechanism.

9. The method of claim 1, wherein kinematically linking the first point to the second point includes applying a kinematic conversion mechanism of the same type as the dynamic conversion mechanism to the first point.

10. The method of claim 9, wherein the kinematic conversion mechanism comprises one of a vertical stretch, a ray tracing, or an Eikonal wave front reconstruction.

11. The method of claim 1, further comprising pre-computing or computing on the fly a kinematic conversion between at least a portion of the data points in the first seismic and a portion of the data points in the second seismic domain.

12. The method of claim 1, further comprising kinematically linking the first point with a second point in the set of seismic data in a second seismic domain related to the first seismic domain by a velocity model in time or in depth.

13. The method of claim 1, wherein kinematically linking the first point with the second point comprises kinematically linking the first point point-to-point with the second point.

14. The method of claim 1, kinematically linking the first point with the second point comprises kinematically linking the first point surface patch-by-surface patch with the second point.

15. A program storage medium encoded with instructions that, when executed by a computer, perform a method for utilizing seismic data contemporaneously across multiple seismic domains, the method comprising kinematically linking a first point in a set of seismic data having at least three-dimensions in a first seismic domain with a second point in the set of seismic data in a second seismic domain related to the first seismic domain by a velocity model in time or in depth.

16. The program storage medium of claim 15, wherein the encoded method further comprises visualizing the first and second seismic domains.

17. The program storage medium of claim 15, wherein the velocity model in the encoded method comprises an acoustic velocity model, an elastic velocity model, being they isotropic or an anisotropic velocity model.

18. The program storage medium of claim 15, wherein the dynamic conversion mechanism of the velocity model in the encoded method comprises a vertical stretch, zero-offset conversion, image ray conversion, multi-offset conversion, elastic conversion, or four-dimensional conversion type of mechanism.

19. The program storage medium of claim 15, wherein kinematically linking the first point to the second point in the encoded method includes applying a kinematic conversion mechanism of the same type as the dynamic conversion mechanism of the velocity model to the first point.

20. The program storage medium of claim 15, wherein the encoded method further comprises pre-computing or computing on the fly a kinematic conversion between at least a portion of the data points in the first seismic and a portion of the data points in the second seismic domain.

21. The program storage medium of claim 15, wherein the encoded method further comprises kinematically linking the first point with a second point in the set of seismic data in a second seismic domain related to the first seismic domain by a velocity model in time or in depth.

22. The program storage medium of claim 15, wherein kinematically linking the first point with the second point in the encoded method comprises kinematically linking the first point point-to-point with the second point.

23. The program storage medium of claim 15, kinematically linking the first point with the second point in the encoded method comprises kinematically linking the first point surface patch-by-surface patch with the second point.

24. A computer programmed to perform a method for utilizing seismic data contemporaneously across multiple seismic domains, the method comprising kinematically linking a first point in a set of seismic data having at least three-dimensions in a first seismic domain with a second point in the set of seismic data in a second seismic domain related to the first seismic domain by a velocity model in time or in depth.

25. The computer of claim 24, wherein the encoded method further comprises visualizing the first and second seismic domains.

26. The computer of claim 24, wherein the velocity model in the encoded method comprises an acoustic velocity model, an elastic velocity model, being they isotropic or an anisotropic velocity model.

27. The computer of claim 24, wherein the dynamic conversion mechanism of the velocity model in the encoded method comprises a vertical stretch, zero-offset conversion, image ray conversion, multi-offset conversion, elastic conversion, or four-dimensional conversion type of mechanism.

28. The computer of claim 24, wherein kinematically linking the first point to the second point in the encoded method includes applying a kinematic conversion mechanism of the same type as the dynamic conversion mechanism of the velocity model to the first point.

29. The computer of claim 24, wherein the encoded method further comprises pre-computing or computing on the fly a kinematic conversion between at least a portion of the data points in the first seismic and a portion of the data points in the second seismic domain.

30. The computer of claim 24, wherein the encoded method further comprises kinematically linking the first point with a second point in the set of seismic data in a second seismic domain related to the first seismic domain by a velocity model in time or in depth.

31. The computer of claim 24, wherein kinematically linking the first point with the second point in the encoded method comprises kinematically linking the first point point-to-point with the second point.

32. The computer of claim 24, kinematically linking the first point with the second point in the encoded method comprises kinematically linking the first point surface patch-by-surface patch with the second point.

33. A method for visualizing a set of seismic data in multiple seismic domains, comprising:
visualizing the seismic data in a first seismic domain;
visualizing the seismic data in a second seismic domain, the second seismic domain being related to the first seismic domain by a velocity model in time or depth and an appropriate conversion mechanism; and
kinematically linking the first and second seismic domains through a kinematic conversion mechanism of the same type as the dynamic conversion mechanism used to generate the second seismic data from the first seismic data based on the appropriate velocity model.

34. The method of claim 33, further comprising visualizing the first and second seismic domains.

35. The method of claim 33, wherein the velocity model comprises an acoustic velocity model, an elastic velocity model, being they isotropic or an anisotropic velocity model.

36. The method of claim 33, wherein the dynamic conversion mechanism comprises a vertical stretch, zero-offset conversion, image ray conversion, multi-offset conversion, elastic conversion, or four-dimensional conversion type of mechanism.

37. The method of claim 33, wherein kinematically linking the first and second seismic domains includes applying a kinematic conversion mechanism of the same type as the dynamic conversion mechanism of the velocity model to the first seismic domain.

38. The method of claim 33, further comprising kinematically linking the first and second seismic domains in the set of seismic data in a second seismic domain related to the first seismic domain by a velocity model in time or in depth.

39. The method of claim 33, wherein kinematically linking the first and second seismic domains comprises kinematically linking the first seismic domain point-to-point with the second seismic domain.

40. The method of claim 33, kinematically linking the first and second seismic domains comprises kinematically linking the first seismic domain surface patch-by-surface patch with the second seismic domain.

41. A method for detecting discrepancies in three-dimensional seismic data between multiple seismic domains thereof, comprising:
kinematically linking a first seismic domain of the seismic data to a second seismic domain of the data;
kinematically linking the second seismic domain to a third seismic domain and
comparing the first seismic domain to the third seismic domain over the kinematic link between the first and second seismic domains and over the kinematic link between the second and third seismic domains; and
detecting discrepancies between the first and third seismic domains as a consequence of the comparison.

42. The method of claim 41, further comprising visualizing the first seismic domain, the second seismic domain, and the third seismic domain.

43. The method of claim 41, wherein linking the first and second seismic domains or linking the second and third seismic domains includes employing an acoustic velocity model, an elastic velocity model, being they isotropic or an anisotropic velocity model.

44. The method of claim 41, wherein the linking the first and second seismic domains or linking the second and third seismic domains includes employing a dynamic conversion mechanism comprising a vertical stretch, zero-offset conversion, image ray conversion, multi-offset conversion, elastic conversion, or four-dimensional conversion type of mechanism.

45. The method of claim 41, wherein kinematically linking the first and second seismic domains includes applying a kinematic conversion mechanism of the same type as the dynamic conversion mechanism of the velocity model to the first seismic domain.

46. The method of claim 41, further comprising kinematically linking the first and second seismic domains in the set of seismic data in a second seismic domain related to the first seismic domain by a velocity model in time or in depth.

47. The method of claim 41, wherein kinematically linking the first and second seismic domains comprises kinematically linking the first seismic domain point-to-point with the second seismic domain.

48. The method of claim 41, kinematically linking the first and second seismic domains comprises kinematically linking the first seismic domain surface patch-by-surface patch with the second seismic domain.

49. A method for accumulating complementary information extracted from multiple seismic domains of a set of seismic data, comprising:

interpreting a first seismic domain of the seismic data;

kinematically linking the first seismic domain to a second seismic domain of the seismic data;

seeding the second seismic domain with the interpretation of the first seismic domain;

hunting for complementary information in the second seismic domain; and persisting the complementary information to the first seismic domain.

50. The method of claim 49, further comprising visualizing the first and second seismic domains.

51. The method of claim 49, wherein the velocity model comprises an acoustic velocity model, an elastic velocity model, being they isotropic or an anisotropic velocity model.

52. The method of claim 49, wherein the dynamic conversion mechanism comprises a vertical stretch, zero-offset conversion, image ray conversion, multi-offset conversion, elastic conversion, or four-dimensional conversion type of mechanism.

53. The method of claim 49, wherein kinematically linking the first and second seismic domains includes applying a kinematic conversion mechanism of the same type as the dynamic conversion mechanism of the velocity model to the first seismic domain.

54. The method of claim 49, further comprising kinematically linking the first and second seismic domains in the set of seismic data in a second seismic domain related to the first seismic domain by a velocity model in time or in depth.

55. The method of claim 49, wherein kinematically linking the first and second seismic domains comprises kinematically linking the first seismic domain point-to-point with the second seismic domain.

56. The method of claim 49, kinematically linking the first and second seismic domains comprises kinematically linking the first seismic domain surface patch-by-surface patch with the second seismic domain.

57. The method of claim 49, further comprising:

reinterpreting the first seismic domain of the seismic data, including the information persisted from the second seismic domain;

kinematically linking the first seismic domain to a third seismic domain of the seismic data;

seeding the third seismic domain with the reinterpretation of the first seismic domain;

hunting for additional complementary information in the third seismic domain; and persisting the additional complementary information to the first seismic domain.

58. A method for improving the exploitation of information extracted from a multi fold seismic data, comprising:

kinematically linking a multi-fold seismic domain of the seismic data to an equivalent one fold seismic domain;

rearranging the data of the multi-fold seismic domain in light of the information identified in the one fold seismic domain.

59. The method of claim 58, further comprising visualizing the multi-fold and single-fold seismic domains.

60. The method of claim 58, wherein the velocity model comprises an acoustic velocity model, an elastic velocity model, being they isotropic or an anisotropic velocity model.

61. The method of claim 58, wherein the dynamic conversion mechanism comprises a vertical stretch, zero-offset conversion, image ray conversion, multi-offset conversion, elastic conversion, or four-dimensional conversion type of mechanism.

62. The method of claim 58, wherein kinematically linking the multi-fold and single-fold seismic domains includes applying a kinematic conversion mechanism of the same type as the dynamic conversion mechanism of the velocity model to the multi-fold seismic domain.

63. The method of claim 58, further comprising kinematically linking the multi-fold and single-fold seismic domains in the set of seismic data in a single-fold seismic domain related to the multi-fold seismic domain by a velocity model in time or in depth.

64. The method of claim 58, wherein kinematically linking the multi-fold and single-fold seismic domains comprises kinematically linking the multi-fold seismic domain point-to-point with the single-fold seismic domain.

65. The method of claim 58, kinematically linking the multi-fold and single-fold seismic domains comprises kinematically linking the multi-fold seismic domain surface patch-by-surface patch with the single-fold seismic domain.

* * * * *